(12) United States Patent
Landerer et al.

(10) Patent No.: US 10,862,179 B2
(45) Date of Patent: Dec. 8, 2020

(54) BATTERY MODULE AND HIGH-VOLTAGE ACCUMULATOR

(71) Applicant: Bayerische Motoren Werke Aktiengesellschaft, Munich (DE)

(72) Inventors: Florian Landerer, Grafing (DE); Sebastian Siering, Munich (DE); Fabian Burkart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 15/680,923

(22) Filed: Aug. 18, 2017

(65) Prior Publication Data

US 2017/0346142 A1 Nov. 30, 2017

Related U.S. Application Data

(63) Continuation of application No. PCT/EP2016/056266, filed on Mar. 22, 2016.

(30) Foreign Application Priority Data

Apr. 27, 2015 (DE) .................. 10 2015 207 666

(51) Int. Cl.
| | |
|---|---|
| *H01M 10/625* | (2014.01) |
| *H01M 2/10* | (2006.01) |
| *H01M 10/04* | (2006.01) |
| *H01M 10/6556* | (2014.01) |
| *H01M 10/6568* | (2014.01) |
| *H01M 2/02* | (2006.01) |

(52) U.S. Cl.
CPC ....... *H01M 10/625* (2015.04); *H01M 2/0252* (2013.01); *H01M 2/1072* (2013.01);
(Continued)

(58) Field of Classification Search
CPC .......... H01M 10/0436; H01M 10/045; H01M 10/0431; H01M 6/40; H01M 6/18;
(Continued)

(56) References Cited

U.S. PATENT DOCUMENTS

| | | | |
|---|---|---|---|
| 2012/0156543 A1 | 6/2012 | Cicero et al. | |
| 2012/0183823 A1 | 7/2012 | Von Borck et al. | |

(Continued)

FOREIGN PATENT DOCUMENTS

| | | |
|---|---|---|
| DE | 10 2008 034 874 A1 | 1/2010 |
| DE | 10 2009 018 787 A1 | 10/2010 |

(Continued)

OTHER PUBLICATIONS

DE102011084660.*
(Continued)

*Primary Examiner* — Milton I Cano
*Assistant Examiner* — Kiran Akhtar
(74) *Attorney, Agent, or Firm* — Crowell & Moring LLP (57) ABSTRACT

A high-voltage accumulator battery module includes a first connection component adjacent to a plate-shaped frame component remotely from a heat sink. The first connection component includes at least one of: an inlet first connection unit having a fluid inlet connected to a cooling channel system via an inlet fluid line connecting the fluid inlet to an inlet second connection unit connected to the cooling channel system, and an outlet first connection unit having a fluid outlet connected to the cooling channel system via an outlet fluid line connecting the fluid outlet to an outlet second connection unit connected to the cooling channel system. A second connection component is adjacent to the plate-shaped frame component at the heat sink side, and includes at least one of: the inlet second connection unit, and the outlet second connection unit. A clamping device clamps the first and second connection components against each other.

11 Claims, 7 Drawing Sheets

(52) U.S. Cl.
CPC ....... *H01M 2/1083* (2013.01); *H01M 2/1088* (2013.01); *H01M 10/0413* (2013.01); *H01M 10/0481* (2013.01); *H01M 10/6556* (2015.04); *H01M 10/6568* (2015.04)

(58) Field of Classification Search
CPC ...... H01M 2/16; H01M 2/145; H01M 2/0275; H01M 2/0202; H01M 2/1653; H01M 2/0285; H01M 2002/0297; H01M 2220/30; H01M 10/625; H01M 10/6568; H01M 10/6556; H01M 10/0481; H01M 10/0413; H01M 2/1072; H01M 2/1083; H01M 2/0252; H01M 2/1088
See application file for complete search history.

(56) References Cited

U.S. PATENT DOCUMENTS

2012/0188714 A1* 7/2012 Von Borck .......... H01M 2/1061
    361/688

2014/0193686 A1* 7/2014 Siering ............... H01M 2/1072
    429/99

FOREIGN PATENT DOCUMENTS

| DE | 10 2011 084 660 A1 | 4/2013 | |
| DE | 102011084660 | * 4/2013 | ............ H01M 10/50 |
| DE | 10 2012 219 301 A1 | 2/2014 | |

OTHER PUBLICATIONS

International Search Report (PCT/ISA/210) issued in PCT Application No. PCT/EP2016/056266 dated May 13, 2016 with English translation (five pages).

German-language Written Opinion (PCT/ISA/237) issued in PCT Application No. PCT/EP2016/056266 dated May 13, 2016 (five pages).

German Search Report issued in counterpart German Application No. 10 2015 207 666.0 dated Dec. 4, 2015 with partial English translation (14 pages).

* cited by examiner

BATTERY MODULE AND HIGH-VOLTAGE ACCUMULATOR

CROSS REFERENCE TO RELATED APPLICATIONS

This application is a continuation of PCT International Application No. PCT/EP2016/056266, filed Mar. 22, 2016, which claims priority under 35 U.S.C. § 119 from German Patent Application No. 10 2015 207 666.0, filed Apr. 27, 2015, the entire disclosures of which are herein expressly incorporated by reference.

BACKGROUND AND SUMMARY OF THE INVENTION

The invention relates to a battery module for a high-voltage accumulator, especially of an electrically drivable motor vehicle, having at least one electric storage cell, at least two plate-shaped frame components which are arranged on the end faces and between which the electric storage cell is arranged, at least one plate-shaped heat sink with at least one cooling channel system, which is connected to the electric storage cells in a thermally conductive manner, at least one fluid inlet which is communicatively connected to the cooling channel system via at least one first fluid connection, and at least one fluid outlet which is communicatively connected to the cooling channel system via at least one second fluid connection. The fluid inlet and the fluid outlet are arranged adjacent to respectively one of the plate-shaped frame components remotely from the heat sink. At least one of the fluid connections has at least one first connection unit, which is arranged adjacent to the respective plate-shaped frame component remotely from the heat sink and which forms the fluid inlet or the fluid outlet, and at least one fluid line which is communicatively connected to the first connection unit.

Moreover, the invention relates to a high-voltage accumulator, especially one for an electrically drivable motor vehicle.

In electrically drivable motor vehicles, especially electric cars, hybrid vehicles and plug-in hybrid vehicles, high-voltage accumulators are used with a plurality of electrically interconnected electric storage cells in the form of secondary battery cells in order to provide electrical drive units of the motor vehicles with electrical energy. Such a high-voltage accumulator may have several electrically interconnected subunits, so-called battery modules, each of which comprises several electrically interconnected electric storage cells. The electric storage cells of such a battery module can be assembled into a cell stack, which is usually compressed during the manufacturing process, clamped by an encircling module frame, and held in shape. The module frame can additionally serve for fastening the battery module to a housing of the high-voltage accumulator, for which it is usually provided with a device, such as a module holder, by which the battery cell module can be secured to the housing.

Battery modules are generally provided with a cooling arrangement in order not to exceed a maximum allowable operating temperature of the electric storage cells during operation of the high-voltage accumulator. Such a cooling arrangement usually comprises a cooling plate with a cooling channel system arranged therein, through which a gaseous, liquid, or multiphase coolant can be conducted for the active cooling of the electric storage cells.

In current cooling arrangements, the cooling plate is connected by integral bonding to the electric storage cells of a battery module, so that these components of a battery module are bonded together to form a unit. In this way, such a battery module forms the smallest replaceable energy storage unit of a high-voltage accumulator. Due to this modular design of a high-voltage accumulator, at least one incoming flow and one return flow of the coolant are needed for each battery module. Furthermore, due to the modular design for each battery module, at least one separating point at the incoming flow and at least one separating point at the return flow of the coolant are required. Since the structural space in the horizontal X and Y directions is often less critical than in the vertical Z direction, the separating points or the fluid coupling flanges forming the separating points are usually positioned on a battery module such that their arrangement extends in the X and Y direction.

DE 10 2011 084 660 A1 discloses a battery module for a high-voltage accumulator of an electrically drivable motor vehicle. The battery module comprises several electric storage cells, two plate-shaped elements arranged on the end faces and between which the electric storage cells are arranged, a plate-shaped heat sink with at least one interior cooling channel system, which is connected to the electric storage cells in a thermally conductive manner, one fluid inlet which is communicatively connected to the cooling channel system via at least one first fluid connection, and at least one fluid outlet which is communicatively connected to the cooling channel system via at least one second fluid connection. The fluid inlet and the fluid outlet are arranged adjacent to one of the plate-shaped elements remotely from the heat sink. Each fluid connection comprises a separate connection unit, which is arranged adjacent to the respective plate-shaped element remotely from the heat sink and which forms the fluid inlet or the fluid outlet. Furthermore, each fluid connection comprises at least one fluid line communicatively connecting the connection unit to the cooling channel system. Each fluid line is connected for this by one end through integral bonding, such as a solder connection, to a large side of the plate-shaped heat sink.

The object of the invention is to lower the assembly expense involved in an assembly of a battery module or a high-voltage accumulator outfitted with battery modules.

This and other objects are achieved by a battery module, as well as by a high voltage accumulator having the battery module, in accordance with embodiments of the invention.

The battery module according to the invention for a high-voltage accumulator, especially of an electrically drivable motor vehicle, comprises at least one electric storage cell, at least two plate-shaped frame components which are arranged on the end faces and between which the electric storage cell is arranged, at least one plate-shaped heat sink with at least one cooling channel system, which is connected to the electric storage cells in a thermally conductive manner, at least one fluid inlet which is communicatively connected to the cooling channel system via at least one first fluid connection, and at least one fluid outlet which is communicatively connected to the cooling channel system via at least one second fluid connection, wherein the fluid inlet and the fluid outlet are arranged adjacent to respectively one of the plate-shaped frame components remotely from the heat sink, and wherein at least one of the fluid connections has at least one first connection unit, which is arranged adjacent to the respective plate-shaped frame component remotely from the heat sink and which forms the fluid inlet or the fluid outlet, and at least one fluid line which is communicatively connected to the first connection unit. Furthermore, the battery module according to the invention comprises at least one clamping device, wherein the fluid connection comprising the first connection unit has at least one second connection unit which is arranged at the heat sink side adjacent to the respective plate-shaped frame component and is communicatively connected to the cooling channel system and to the heat sink at the end face, wherein the two connection units can be clamped against each other by the clamping device, and wherein the fluid line is connected to at least one of the two connection units via at least one seal.

According to the invention, the two connection units of the fluid connection are clamped against each other by the clamping device, which can have, for example, a clamping screw and a threaded bore, by which the fluid line is fixed in order to form the fluid connection between the connection units. The fluid connection has a separating point between the fluid line and the at least one connection unit which is connectable to the fluid line via the seal, such as an axial seal or a radial seal, which separating point is sealed off by the clamping of the connection units, for example, by a form fit between the fluid line and the connection unit, forming the seal. It is not necessary to connect the fluid line by integral bonding to the connection unit.

A seal comprises two components, made as stiff as possible, being in the case of the battery module the fluid line and the connection unit which is connectable to the fluid line via the seal. The components of a seal are mechanically clamped against each other to form the seal, using a clamping device. In order to achieve a greater sealing action, the seal of the battery module can have at least one axial sealing element or one radial sealing element, such as a sealing ring, which is clamped by the clamping device between the fluid line and the connection unit which is connectable to the fluid line via the seal.

For the assembly of the battery module, at first the second connection unit can be arranged at the heat sink side adjacent to the respective plate-shaped frame component and communicatively connected to the cooling channel system and also to the heat sink at the end face. Next, the fluid line can be connected for example to the second connection unit, especially by integral bonding. Alternatively, the second connection unit and the fluid line can be produced monolithically with each other. For example, the second connection unit can be made as a single piece with the fluid line in the form of a male or female flange, using a casting method or a milling method. After arranging the second connection unit and the fluid line on the plate-shaped heat sink, a subassembly composed of the at least one electric storage cell and a module frame enclosing the electric storage cell can be arranged on the plate-shaped heat sink. Finally, the first connection unit, which can be configured for example as a female or male flange, can be connected via the seal to the fluid line, which is accomplished by tightening the clamping device. Alternatively, the fluid line can be connected to the first connection unit by integral bonding or produced monolithically with the latter. For example, the first connection unit can be made as a single piece with the fluid line in the form of a male or female flange, using a casting method or a milling method. The unit formed accordingly from the first connection unit and the fluid line can be arranged on the subassembly, which is composed of the at least one electric storage cell and a module frame enclosing the electric storage cell. The structural unit so formed can be arranged on the plate-shaped heat sink. Finally, the second connection unit, which can be configured for example as a female or male flange, can be connected via the seal to the fluid line, which is accomplished by tightening the clamping device. After the subassembly has been arranged on the plate-shaped heat sink, no components of the fluid connection need be connected by integral bonding together and/or to the plate-shaped heat sink in order to form the fluid connection.

In contrast with this, for the battery module per DE 10 2011 084 660 A1, once the electric storage cells have been arranged on the plate-shaped heat sink, in order to form a fluid connection between the cooling channel system and the fluid inlet or fluid outlet, the fluid line must always be connected by integral bonding to the plate-shaped heat sink. In particular, one end of the fluid line is soldered to the plate-shaped heat sink in this case. The connection units per DE 10 2011 084 660 A1 are also each soldered to a fluid line. Due to the subsequent soldering steps required, the fabrication of the traditional battery module is much more costly than the fabrication of the battery module according to the invention. Furthermore, the subsequent soldering steps should be viewed as extremely problematical on account of the associated temperature effect on the electric storage cells. This problem does not occur in the assembly of the battery module according to the invention, since no corresponding subsequent soldering of fluid line and plate-shaped heat sink is required.

In the battery module according to the invention, the plate-shaped heat sink together with the second connection unit arranged thereon can be connected much more easily and in a more space-saving manner to a subassembly consisting of the at least one electric storage cell and the module frame, possibly weight-optimized by providing a honeycomb structure, since the subassembly and the plate-shaped heat sink can be brought up and joined to each other in the vertical Z direction. This linear or straight-line joining process enables an easy serial manufacturing. No costly and safety-critical intermediate steps are required, as is the case in the manufacturing of the battery module per DE 10 2011 084 660 A1.

According to the invention, the fluid inlet and the fluid outlet are arranged in an upper region of the battery module. Thus, the fluid inlet and the fluid outlet are arranged in a more accessible manner than in a traditional sideways arrangement of fluid inlet and fluid outlet in a lower region of a battery module, especially alongside the plate-shaped heat sink. This facilitates the assembly and the handling of the battery module as compared to such traditional battery modules. In particular, a sealing flange of a fluid inlet or fluid outlet traditionally positioned directly on the plate-shaped heat sink is hard to reach. This poor accessibility of fluid inlet and fluid outlet greatly complicates the assembly of the battery module and is associated with the risk of sensitive components becoming damaged, especially the plate-shaped heat sink. The poor accessibility of fluid inlet and fluid outlet furthermore requires the use of special captive screws, by which the sealing flanges of the fluid inlet and the fluid outlet can be connected with force locking to flanges of a coolant circuit, since any objects lost in a high-voltage accumulator during the assembly process, such as loose screws, nuts, or the like, usually require a complete disassembly of the high-voltage accumulator in order to retrieve the lost objects and thereby assure the operating safety.

Furthermore, sealing flanges positioned sideways form a flywheel mass, which under vibrational loading may damage the usually provided integrally bonded connection between the plate-shaped heat sink and the electric storage cells over the service life of a high-voltage accumulator. On the contrary, the arrangement according to the invention of the fluid inlet and the fluid outlet in the upper region of the battery module has the benefit that no corresponding flywheel masses are formed. Consequently, the battery module according to the invention is more robust and thus more durable than traditional battery modules with sealing flanges for the fluid inlet and the fluid outlet arranged sideways in a lower region.

In contrast with sealing flanges for the fluid inlet and the fluid outlet arranged sideways in a lower region of the battery module, in the battery module according to the invention, where the first connection unit is arranged in an upper and thus more accessible region of the battery module, the first connection unit is much more easily connected via a coolant fluid connection to a media circuit of a motor vehicle and/or other battery modules of the high-voltage accumulator, especially since the assembly force upon activating the clamping device can be absorbed by the plate-shaped frame component arranged between the connection units. Furthermore, in the battery module according to the invention, an easy tolerance compensation is provided between plate-shaped frame component, plate-shaped heat sink, and first connection unit.

The fluid inlet and the fluid outlet can accordingly be arranged remotely from the heat sink on a common frame component or on different frame components. Two or more fluid inlets and fluid outlets may also be arranged on a common frame component or on different frame components. In this way, pressure losses may possibly be reduced.

The geometry of the second connection unit may be adapted to the available structural space underneath the plate-shaped frame component such that the least possible structural space is used by the second connection unit. Furthermore, the second connection unit can have a special connection geometry which ensures that the plate-shaped heat sink is introduced sideways into the second connection unit with the least possible pressure loss and structural space requirement. In particular, it can be soldered or connected to the second connection unit.

The seal between the fluid line and the at least one connection unit prevents a leakage of the coolant flowing through the fluid connection. As compared to the invention, the sealing surfaces of a fluid coupling arranged traditionally sideways in a lower region of the battery module and the thread of the screws clamping the fluid coupling lie relatively close to each other.

The plate-shaped heat sink can be designed as a traditional cooling plate or can be designed differently. The cooling channel system can be arranged entirely inside the plate-shaped heat sink or elsewhere on the plate-shaped heat sink. The cooling plate in the context of the invention can also be used to heat the at least one electric storage cell, in order to bring the electric storage cell up to an optimal operating temperature.

The length of the fluid line corresponds preferably to around the height of the plate-shaped frame component, so that a simple assembly of the particular connection unit via the seal on the fluid line is possible. The fluid line for example can be fashioned as a thick-walled straight pipe. The end of the fluid line, which can be connected via the seal to one of the connection units, can have a female or male sealing geometry. The connection unit has a correspondingly complementarily shaped sealing geometry.

In the battery module according to the invention, both fluid connections can also be configured accordingly, which is preferable in view of the above-mentioned benefits.

According to an advantageous configuration, one end of the fluid line is connected by integral bonding to that connection unit to which the fluid line is not connected via the seal. Thus, the first connection unit or the second connection unit can be connected by integral bonding to the fluid line. The integrally bonded connection between the fluid line and the connection unit may be configured as a soldered connection. An integrally bonded or monolithic connection between the fluid line and the first connection unit comes with the advantage that the plate-shaped heat sink together with the second connection unit connected to it by integral bonding can be stored with little space requirement.

According to an alternative advantageous embodiment, both connection units are connected each via a seal to the fluid line. According to this embodiment, the fluid connection thus has two corresponding seals, which can be activated or produced by an activating of the clamping device. The frame component in this case can have a female or male sealing geometry at both ends of the bore. The frame component can have a female sealing geometry at one end of the bore and a male sealing geometry at the other end of the bore. Alternatively, the ends of the bore can be provided with an identically configured sealing geometry. The connection units have correspondingly complementarily shaped sealing geometries.

Another advantageous embodiment provides for the fluid line to be guided through a bore arranged on the plate-shaped frame component, wherein an outer diameter of the fluid line is smaller than an inner diameter of the bore. The frame component is preferably designed so that the fluid line can be led through the frame component in regard to tolerances and a sufficiently large, thermally insulating annular air gap between the fluid line and the bore. For this, the difference between the inner diameter of the bore and the outer diameter of the fluid line should be chosen sufficiently large. Alternatively, a vibration and oscillation dampening medium can be present at least partly in the annular air gap to provide a noise optimization.

According to an alternative further advantageous embodiment, the fluid line is formed by a bore on the plate-shaped frame component. This makes the arrangement of a separate fluid line needless and therefore goes hand in hand with a material saving in the formation of the fluid connection and consequently with a more lightweight design of the battery module.

According to another advantageous embodiment, the fluid inlet or the fluid outlet is formed as a lateral exit at the first connection unit, which is arranged transversely to an entrance of the first connection unit which is connectable to the fluid line. In this way, a lateral supplying or draining of the coolant is possible. In this way, valuable structural space can be saved in the Z direction, at the expense of a larger pressure loss due to the deflecting of the coolant in the first connection unit.

Advantageously, both fluid connections are configured accordingly, wherein both the two first connection units and the two second connection units are produced monolithically with each other, and wherein the first connection units are clampable against the second connection units by at least one common clamping device. In this way, fewer individual parts are present, which simplifies the assembly of the battery module further.

Furthermore, it is advantageous for the plate-shaped frame component to be configured as module holders, by which the battery module can be secured to a housing of the high-voltage accumulator, the fastening of the battery module to the housing being done at least partly by the clamping device. The clamping device can be designed as a clamping screw, which can be screwed into a threaded bore on the housing. For reasons of housing tolerances that occur, the battery module can be secured to the housing by way of a three-point screw system, wherein the battery module on one side is screwed to the housing solely by the common clamping screw and on the other side by two clamping screws. For this, the tolerances occurring between the bottom side of the compressed electric storage cells via the plate-shaped heat sink and the second connection unit with respect to the frame component should be either negligibly small or absorbed by a flexibility of the plate-shaped heat sink. Thanks to the integration of functions according to this embodiment, the two connection units are clamped against each other by the common clamping device and the battery module is secured to the housing of the high-voltage accumulator. Thus, the common clamping device serves for compressing and forming the seals of the fluid connections.

The high-voltage accumulator according to the invention, especially for an electrically drivable motor vehicle, comprises at least one battery module according to one of the aforementioned embodiments or any combination thereof. The high-voltage accumulator is associated accordingly with the advantages mentioned above in regard to the battery module.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, functionally identical components are given the same reference numbers.

DETAILED DESCRIPTION OF THE DRAWINGS

Figure 1:
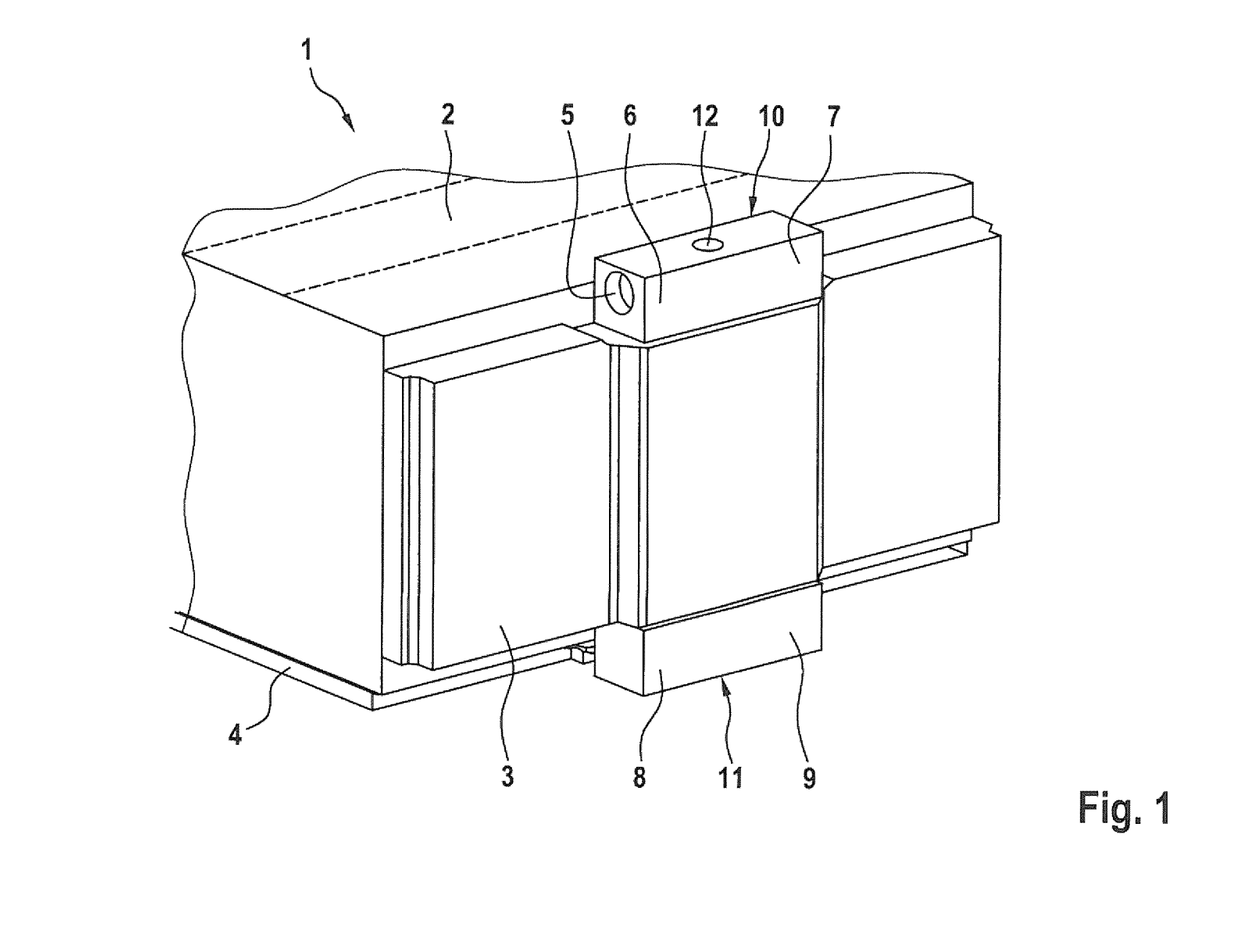
FIG. 1 is a schematic and perspective detailed representation of an exemplary embodiment for a battery module according to the invention.

FIG. 1 shows a schematic and perspective detailed representation of an exemplary embodiment for a battery module 1 according to the invention for a high-voltage accumulator, not otherwise shown, of an electrically drivable motor vehicle.

The battery module 1 includes several electric storage cells 2 and two plate-shaped frame components 3 which are arranged on the end faces and between which the electric storage cells 2 are arranged, FIG. 1 showing only one frame component 3. Furthermore, the battery module 1 includes a plate-shaped heat sink 4 with a cooling channel system not represented in more detail, which is connected to the electric storage cells 2 in a thermally conductive manner. Furthermore, the battery module 1 includes a fluid inlet 5 which is communicatively connected to the cooling channel system via a first fluid connection not shown in FIG. 1, and a fluid outlet opposite the fluid inlet 5 and not visible, which is communicatively connected to the cooling channel system via a second fluid connection not shown in FIG. 1. The design of exemplary embodiments of suitable fluid connections can be seen in FIGS. 2 to 4. The fluid inlet 5 and the fluid outlet are arranged adjacent to the depicted plate-shaped frame component 3 remotely from the heat sink 4.

Both fluid connections are identical in design and each have a first connection unit 6 or 7, which is arranged adjacent to the depicted plate-shaped frame component 3 remotely from the heat sink and which forms the fluid inlet 5 or the fluid outlet, and a fluid line not shown in FIG. 1 which is communicatively connected to the first connection unit 6 or 7. Furthermore, the fluid connections each include a second connection unit 8 or 9 which is arranged at the heat sink side adjacent to the depicted plate-shaped frame component 3 and communicatively connected to the cooling channel system and to the heat sink 4 at the end face. In the exemplary embodiment shown in FIG. 1, both the two first connection units 6 and 7 and the two second connection units 8 and 9 are produced monolithically with each other. The connection components 10 and 11 are formed in this way. Each fluid connection comprises a seal, not shown, in the form of an axial seal via which the respective fluid line is connected to the respective first connection unit 6 or 7. One end of the respective fluid line is connected by integral bonding to the respective second connection unit 8 or 9. The fluid lines are guided through bores arranged on the plate-shaped frame component 3, not shown, wherein an outer diameter of the respective fluid line is smaller than an inner diameter of the respective bore. The fluid inlet 5 and the fluid outlet are each formed as a lateral exit at the respective first connection unit 6 or 7, which is arranged transversely to an entrance of the respective first connection unit 6 or 7, not shown, which is connectable to the respective fluid line.

Figure 2:
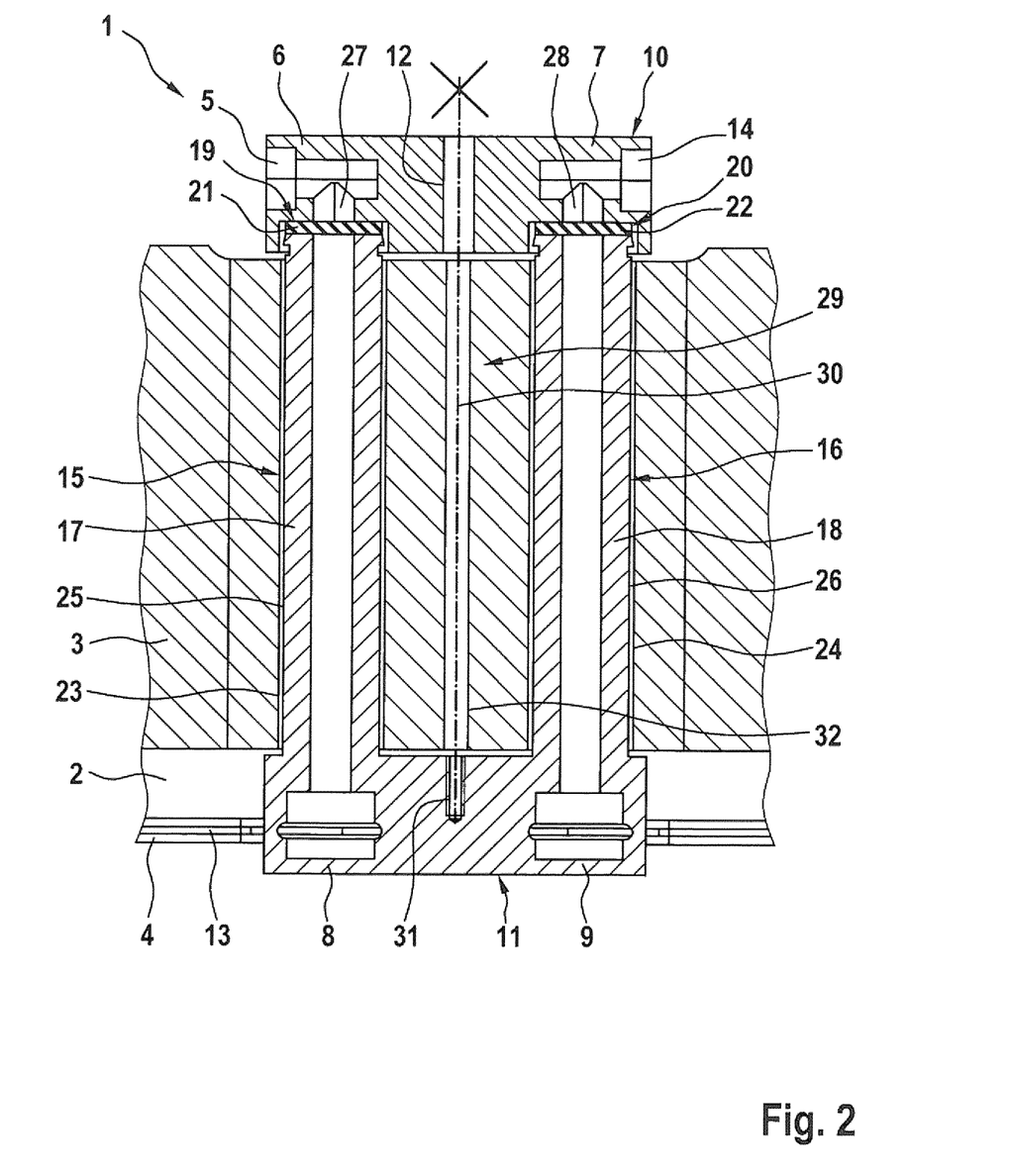
FIG. 2 is a schematic cross-sectional representation of the battery module shown in FIG. 1.

The battery module 1 furthermore comprises a clamping device, not shown, which includes a clamping screw and a threaded bore arranged on the connection component 11, as shown in FIG. 2. On the connection component 10 there is arranged a bore 12, through which the clamping screw can be guided. The connection components 10 and 11 are clamped against each other by means of a single clamping device, so that the first connection units 6 and 7 can be clamped against the second connection units 8 and 9 by a common clamping device.

FIG. 2 shows a cross-sectional representation of the battery module 1 shown in FIG. 1. One can see a section of the cooling channel system 13 of the plate-shaped heat sink 4. Furthermore, the fluid outlet 14 formed by the first connection unit 7 can be seen. Each fluid connection 15 or 16 comprises a fluid line 17 or 18, which are communicatively connected to the respective first connection unit 6 or 7 via a seal 19 or 20 in each case. Each seal 19 or 20 comprises an axial sealing element 21 or 22, fashioned as a sealing ring. Each first connection unit 6 or 7 has a female connection geometry and each fluid line 17 or 18 has a male connection geometry in the region of the respective seal 19 or 20. One end of the respective fluid line 17 or 18 is connected by integral bonding to the respective second connection unit 8 or 9. The fluid lines 17 and 18 are guided through bores 23 and 24 arranged on the plate-shaped frame component 3, wherein an outer diameter of the respective fluid line 17 or 18 is smaller than an inner diameter of the respective bore 23 or 24. In this way, thermally insulating annular gaps 25 and 26 containing air are formed between the fluid lines 17 and 18 and the plate-shaped frame component 3. The fluid inlet 5 and the fluid outlet 14 are each formed as a lateral exit at the respective first connection unit 6 or 7, which is arranged transversely to an entrance 27 or 28 of the respective first connection unit 6 or 7 which is connectable to the respective fluid line 17 or 18.

The clamping device 29 includes a clamping screw 30 and a threaded bore 31 arranged on the connection component 11. The clamping screw 30 is guided through the bore 12 arranged on the connection component 10 and through a bore 32 arranged on the plate-shaped frame component 3.

Figure 3:
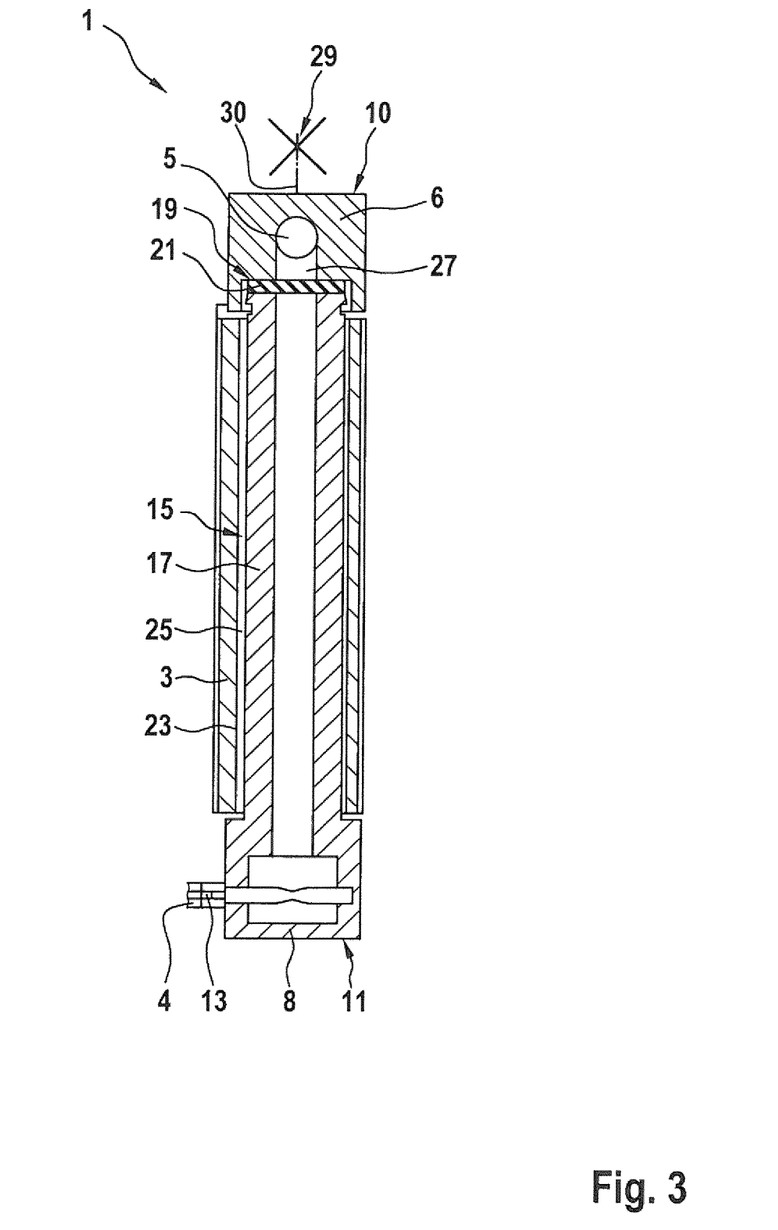
FIG. 3 is another schematic cross-sectional representation of the battery module shown in FIG. 1.

FIG. 3 shows another cross-sectional representation of the battery module 1 shown in FIG. 1 in the region of the fluid connection 15. In particular, the connection between the second connection unit 8 and the cooling channel system 13 can be better seen.

Figure 4:
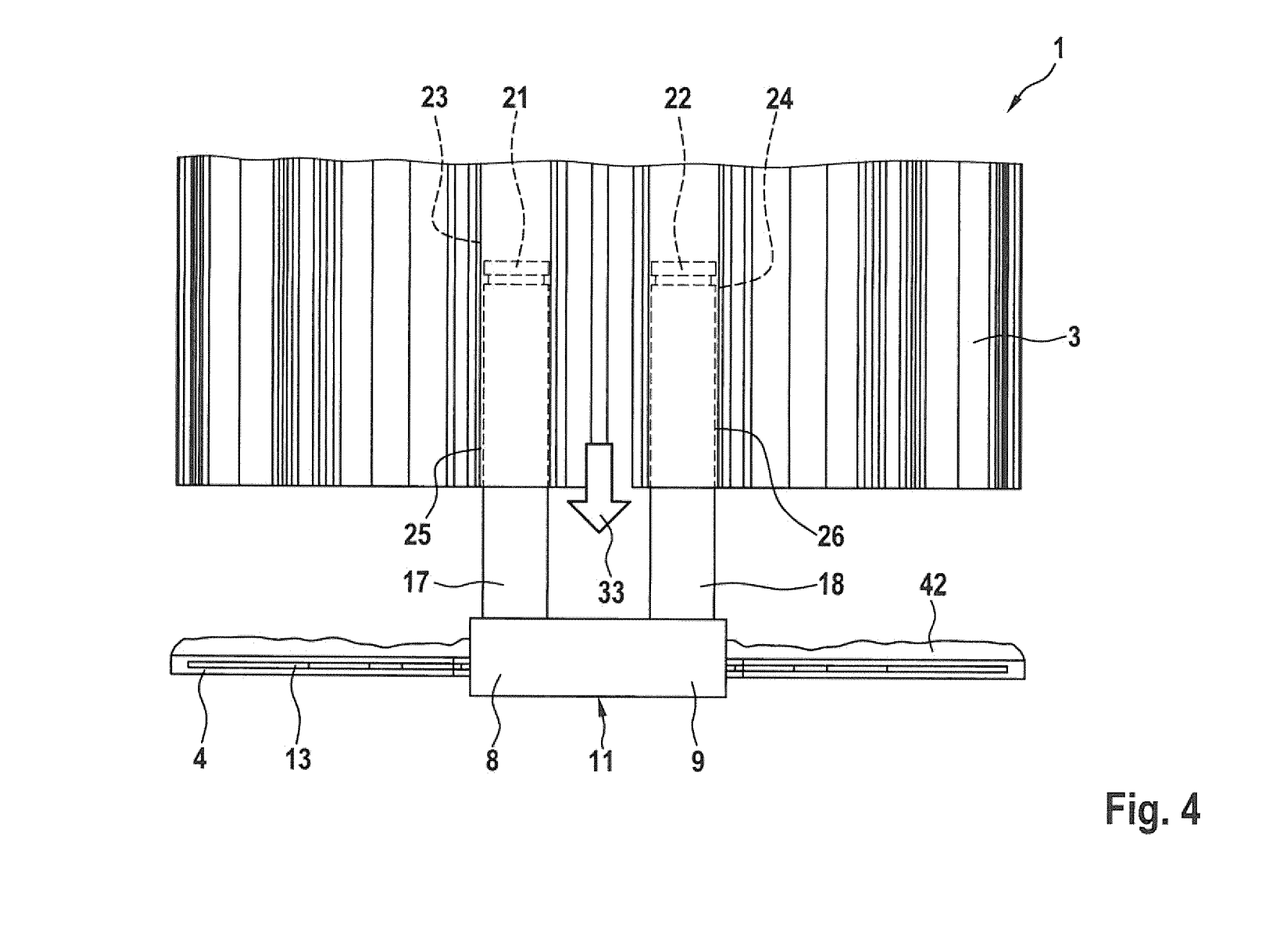
FIG. 4 is a schematic representation of an installed condition of the battery module shown in FIG. 1.

FIG. 4 shows a schematic representation of an installed condition of the battery module 1 shown in FIG. 1. During the assembly of the battery module 1, the subassembly made up of electric storage cells 2 and module frame, of which only the frame component 3 can be seen, can be produced in a traditional manufacturing process. After this, on the cleaned plate-shaped heat sink 4 with the second connection units 8 and 9 soldered on it, or with the connection component 11 soldered on it, on which the fluid lines 17 and 18 are already arranged, a one-sided self-adhesive HV insulating film can be applied, whose surface can be cleaned and activated if need be in a next step. Then, on this surface of the HV insulating film there can be applied a thermally conductive casting compound 42, on which in turn an adhesive can be applied. Alternatively, the thermally conductive casting compound can already possess an adhesive function, so that a separate adhesive is not necessary. Afterwards, the structural unit as described above can be lifted in a centering jig in the vertical direction onto the subassembly made up of electric storage cells 2 and module frame and pressed together with it. Alternatively or in addition, the subassembly can be lifted in the vertical direction onto the structural unit and pressed, as indicated in FIG. 4 by the arrow 33. During this manufacturing process, one should ensure by the layout of the bores 23 and 24 on the plate-shaped frame component 3 in regard to tolerances that occur that the fluid lines 17 and 18 find their way securely and by themselves through the plate-shaped frame component 3.

Figure 5:
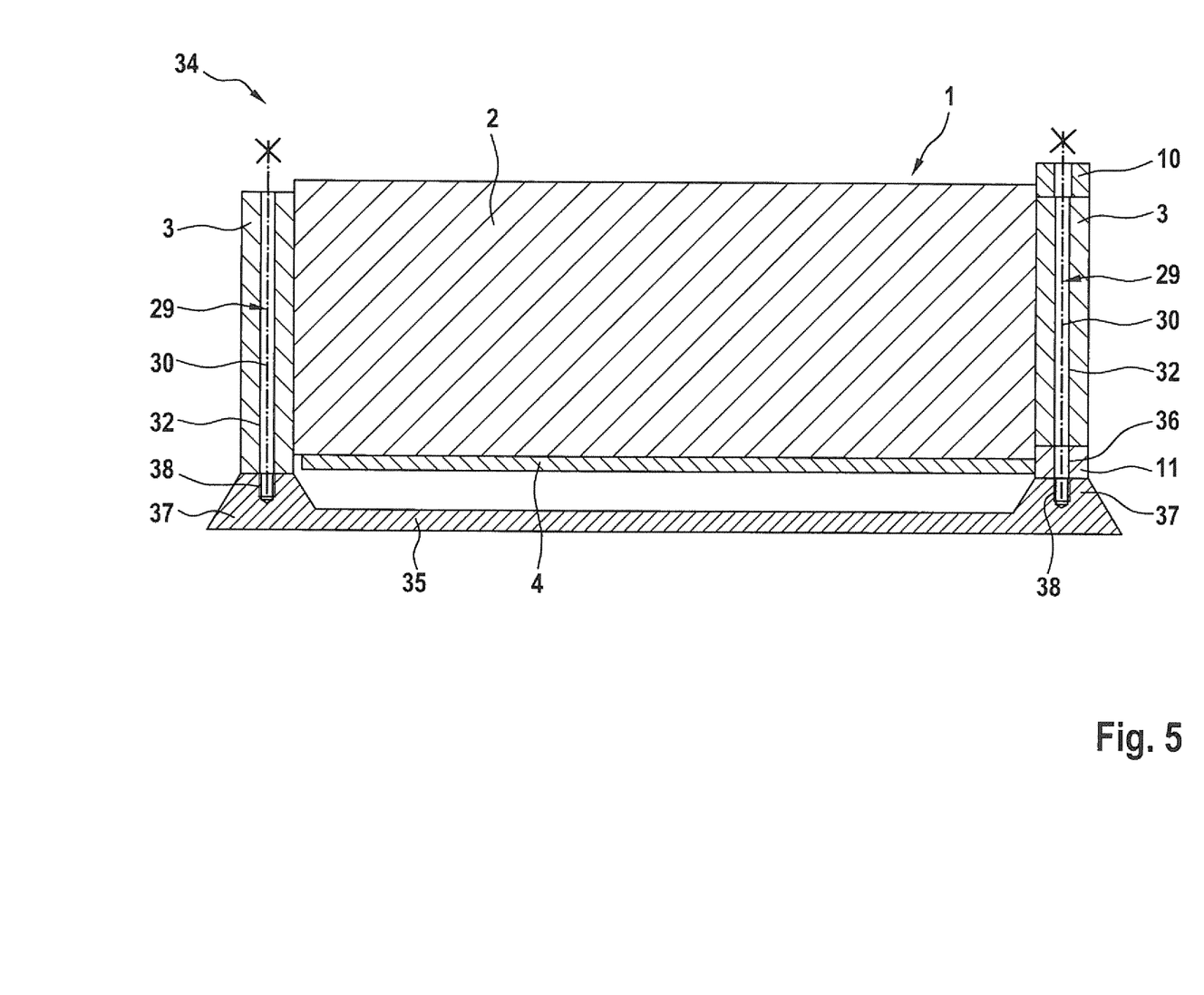
FIG. 5 is a schematic cross-sectional representation of an exemplary embodiment for a high-voltage accumulator according to the invention.
Figure 6:
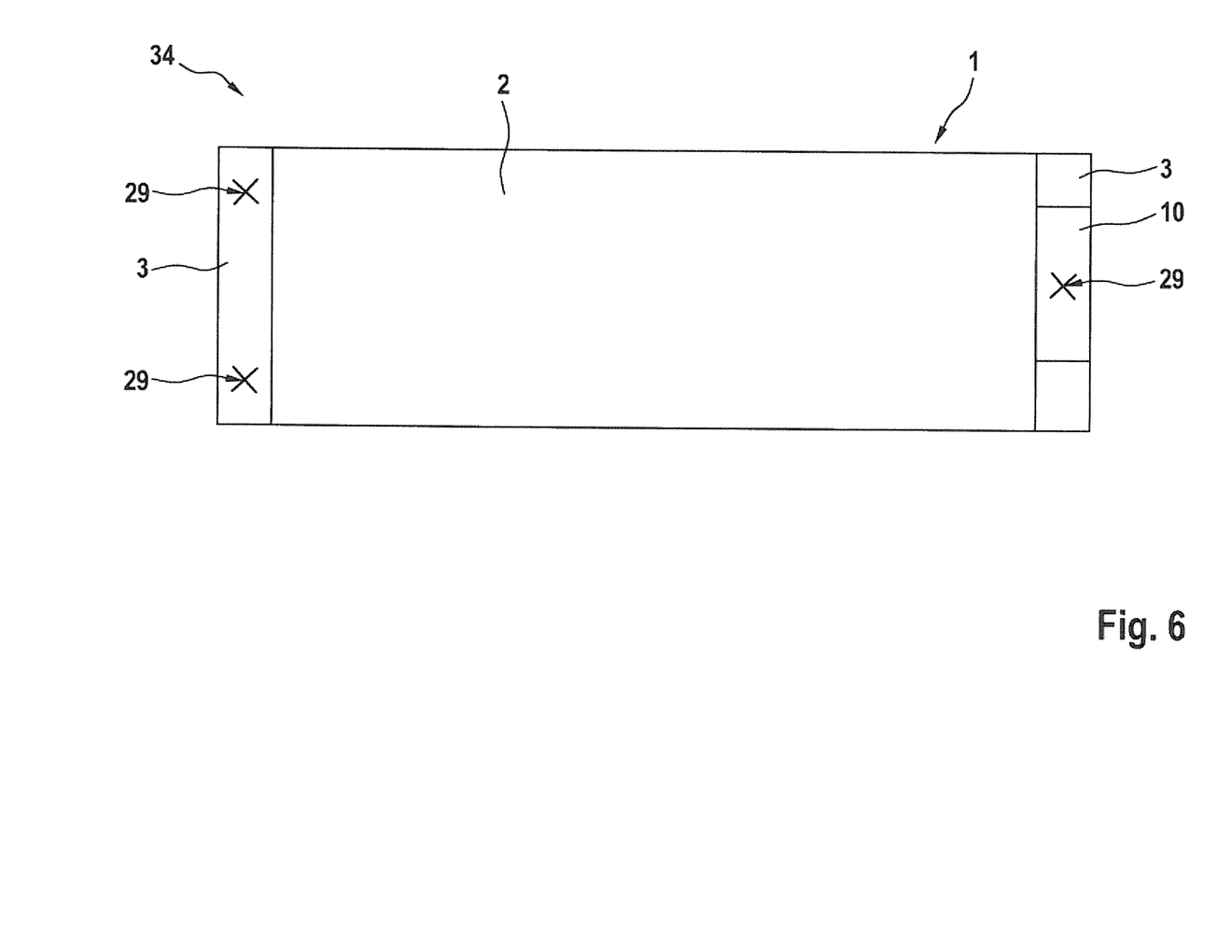
FIG. 6 is a top view of the high-voltage accumulator shown in FIG. 5.

FIG. 5 shows a schematic cross-sectional representation of an exemplary embodiment for a high-voltage accumulator 34 according to the invention for an electrically drivable motor vehicle in the region of a battery module 1. The high-voltage accumulator 34 includes several battery modules 1, of which only one is shown in FIG. 5, and a housing 35. The design of the battery modules 1 can basically correspond to the design shown in FIGS. 1 to 4. In contrast with the exemplary embodiment shown in FIGS. 1 to 4, the plate-shaped frame components 3 are configured as module holders, by which the respective battery module 1 is secured to the housing 35 of the high-voltage accumulator 34. The securing of the battery module 1 to the housing 35 is done partly through the common clamping device 29. On the other side of each battery module 1, two corresponding clamping devices 29 are used for the securing of the battery module to the housing 35, as shown in FIG. 6. On the connection component 11 of each battery module 1 there is arranged a through bore 36 instead of the threaded bore. Threaded bores 38 are arranged on shoulders 37 of the housing 35, into which the clamping screws 30 are screwed. The height of the plate-shaped frame component 3 shown at the right side in FIG. 5 is reduced by the height of the connection component 11 as compared to the height of the plate-shaped frame component 3 shown at the left.

FIG. 6 shows a top view of the high-voltage accumulator 34 shown in FIG. 5. One can see that the battery module 1 is secured by means of the clamping devices 29 through a three-point screw system to the housing 35.

Figure 7:
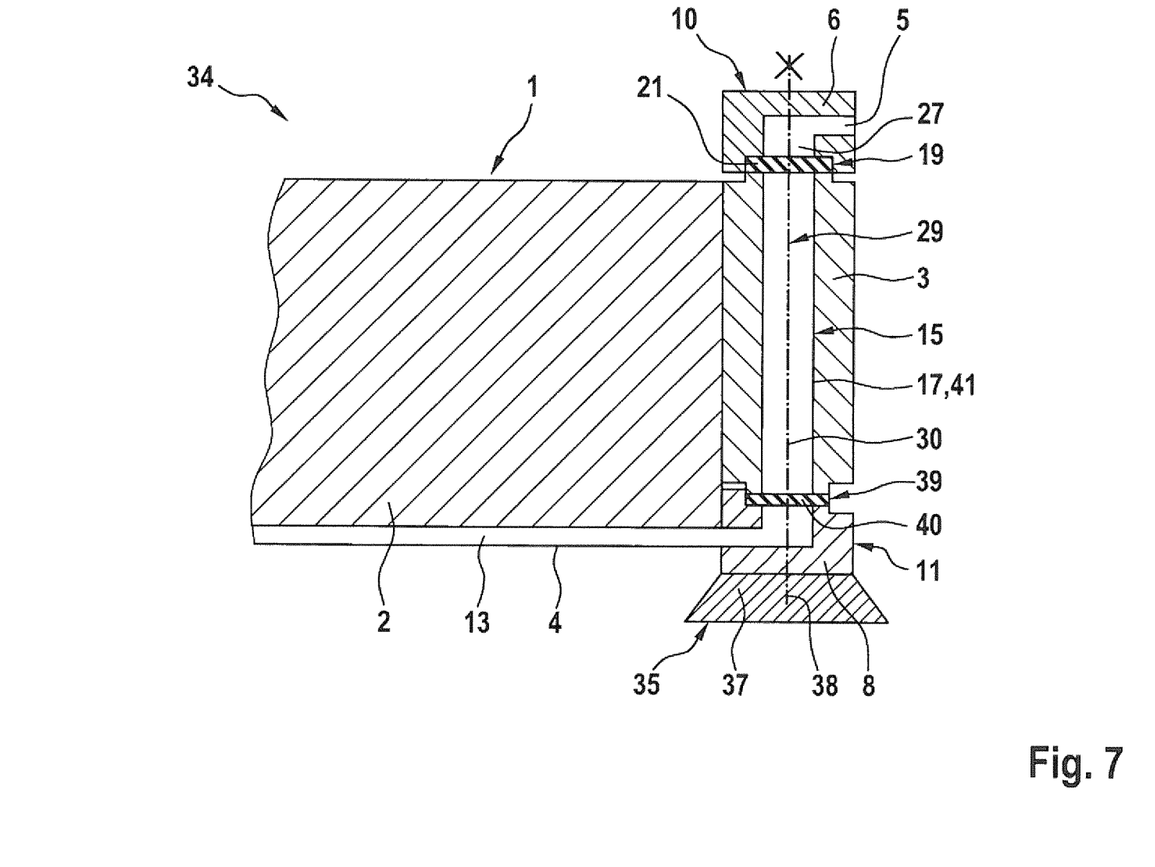
FIG. 7 is a schematic cross-sectional representation of another exemplary embodiment for a high-voltage accumulator according to the invention.

FIG. 7 shows a schematic cross-sectional representation of another exemplary embodiment for a high-voltage accumulator 34 according to the invention in the region of a battery module 1. In this sample embodiment as well, the plate-shaped frame components 3 are configured as module holders corresponding to the exemplary embodiment shown in FIGS. 5 and 6. A significant difference from the exemplary embodiments shown in FIGS. 1 to 6 is that both connection units 6 and 8 or 7 and 9 of a fluid connection 15 or 16 are connected each via a seal 19 or 20 and 39 to the respective fluid line 17 or 18. The seals 39 also each comprise an axial sealing element 40. Furthermore, the fluid lines 17 and 18 are formed by bores 41 on the plate-shaped frame component 3. Otherwise, the battery module 1 can be designed according to the exemplary embodiments shown in FIGS. 1 to 6.

LIST OF REFERENCE NUMBERS 1 battery module
2 storage cells
3 frame component
4 heat sink
5 fluid inlet
6 first connection unit
7 first connection unit
8 second connection unit
9 second connection unit
10 connection component
11 connection component
12 bore
13 cooling channel system
14 fluid outlet
15 fluid connection
16 fluid connection
17 fluid line
18 fluid line
19 seal
20 seal
21 axial sealing element
22 axial sealing element
23 bore
24 bore
25 annular gap
26 annular gap
27 entrance
28 entrance
29 clamping device
30 clamping screw
31 threaded bore
32 bore
33 arrow
34 high-voltage accumulator
35 housing
36 through bore
37 shoulder
38 threaded bore
39 seal
40 axial sealing element
41 bore
42 thermally conductive casting compound The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery module for a high-voltage accumulator, comprising: at least one electric storage cell;
    at least two plate-shaped frame components, which are arranged on end faces and between which the at least one electric storage cell is arranged;
    at least one plate-shaped heat sink with at least one cooling channel system, which is connected to the at least one electric storage cell in a thermally conductive manner;
a first connection component arranged adjacent to a plate-shaped frame component remotely from the heat sink, the first connection component comprising at least one of:
    an inlet first connection unit having a fluid inlet, the fluid inlet communicatively connected to the cooling channel system via at an inlet fluid line connecting the fluid inlet to an inlet second connection unit that is communicatively connected to the cooling channel system, wherein the inlet fluid line is connected to the inlet first connection unit via at least one seal, and
    an outlet first connection unit having a fluid outlet, the fluid outlet communicatively connected to the cooling channel system via at an outlet fluid line connecting the fluid outlet to an outlet second connection unit that is communicatively connected to the cooling channel system, wherein the outlet fluid line is connected to the outlet first connection unit via at least one seal;
a second connection component arranged adjacent to the plate-shaped frame component at a heat sink side so as to connect to the plate-shaped heat sink at an end face of the end faces,
the second connection component comprising at least one of: the inlet second connection unit that communicatively connects the inlet fluid line to the cooling channel system, and the outlet second connection unit that communicatively connects the outlet fluid line to the cooling channel system; and
    at least one clamping device, which clamps the first and second connection components against each other.

2. The battery module as claimed in claim 1, wherein one end of at least one of: the inlet fluid line and the outlet fluid line is connected by integral bonding to the respective second connection unit.

3. The battery module as claimed in claim 1, wherein the inlet first connection unit and the inlet second connection unit are connected, and the outlet first connection unit and the outlet second connection unit are connected, each via a respective seal, to the respective fluid line.

4. The battery module as claimed in claim 1, wherein the respective fluid line is guided through a bore arranged on the plate-shaped frame component, wherein an outer diameter of the fluid line is smaller than an inner diameter of the bore.

5. The battery module as claimed in claim 1, wherein the respective fluid line is formed by a bore in the plate-shaped frame component.

6. The battery module as claimed in claim 1, wherein the fluid inlet or the fluid outlet is formed as a lateral exit at the respective first connection unit, which is arranged transversely to an entrance of the respective first connection unit which is connectable to the respective fluid line.

7. The battery module as claimed in claim 1, wherein the first connection component monolithically comprises both the inlet first connection unit and the outlet first connection unit, and the second connection component monolithically comprises both the inlet second connection unit and the outlet second connection unit.

8. The battery module as claimed in claim 1, wherein the at least two plate-shaped frame components are configured as module holders, by which the battery module is securable to a housing of the high-voltage accumulator, the fastening of the battery module to the housing being done at least partly by the clamping device.

9. The battery module as claimed in claim 1, wherein the battery module is configured for the high-voltage accumulator of an electrically drivable motor vehicle.

10. A high-voltage accumulator, comprising:
    at least one battery module for the high-voltage accumulator, the battery module comprising:
at least one electric storage cell:
at least two plate-shaped frame components, which are arranged on end faces and between which the at least one electric storage cell is arranged:
at least one plate-shaped heat sink with at least one cooling channel system;
    which is connected to the at least one electric storage cell in a thermally conductive manner:
a first connection component arranged adjacent to a plate-shaped frame component remotely from the heat sink, the first connection component comprising at least one of:
an inlet first connection unit having a fluid inlet, the fluid inlet communicatively connected to the cooling channel system via an inlet fluid line connecting the fluid inlet to an inlet second connection unit that is communicatively connected to the cooling channel system, wherein the inlet fluid line is connected to the inlet first connection unit via at least one seal;
and
an outlet first connection unit having a fluid outlet, the fluid outlet communicatively connected to the cooling channel system via an outlet fluid line connecting the fluid outlet to an outlet second connection unit communicatively connected to the cooling channel system, wherein the outlet fluid line is connected to the outlet first connection unit via at least one seal;
a second connection component arranged adjacent to the respective plate shaped frame component at a heat sink side so as to connect to the plate-shaped heat sink at an end face of the end faces, the second connection component comprising at least one of: the
    inlet second connection unit that communicatively connects the inlet fluid line to the cooling channel system, and the outlet second connection unit that communicatively connects the outlet fluid line to the cooling channel system; and
    at least one clamping device, which clamps the first and second connection components against each other.

11. The high-voltage accumulator according to claim 10, wherein the high-voltage accumulator is configured for an electrically drivable motor vehicle.

* * * * *